United States Patent
Ko et al.

(10) Patent No.: US 7,846,993 B2
(45) Date of Patent: Dec. 7, 2010

(54) SILICA MASTER BATCH ELASTOMERS FILLED WITH ORGANICALLY MODIFIED SILICA FOR A TIRE AND PREPARATION METHOD THEREOF

(75) Inventors: Young Hoon Ko, Daejeon (KR); Jae Young Ko, Daejeon (KR); Seung Kyung Ko, Namyangju-si (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 12/251,818

(22) Filed: Oct. 15, 2008

(65) Prior Publication Data

US 2009/0163633 A1    Jun. 25, 2009

(30) Foreign Application Priority Data

Dec. 24, 2007  (KR) .................. 10-2007-0136853

(51) Int. Cl.
*C08K 9/06* (2006.01)
(52) U.S. Cl. .................. 523/212; 523/213; 523/216; 524/492; 524/493
(58) Field of Classification Search ............. 523/212, 523/213, 216; 524/492, 493
See application file for complete search history.

(56) References Cited

U.S. PATENT DOCUMENTS 5,925,713 A    7/1999    Labauze

FOREIGN PATENT DOCUMENTS

WO    WO 98/37015    8/1998

OTHER PUBLICATIONS

Stenger, F. et al.: "Rubber Filler Composites based on Solution Polymers and Silica—Status of Developments", *Donnerstag*, 6, Jul. 6, 2006, Poster 33, pp. 417-419.

*Primary Examiner*—Edward J Cain
(74) *Attorney, Agent, or Firm*—Frommer Lawrence & Haug LLP; Ronald R. Santucci

(57) ABSTRACT

The present invention relates to an organic silica master batch elastomer prepared by mixing a conjugated diene based copolymer, a vinyl aromatic copolymer or a mixture thereof prepared by solution polymerization with organically modified silica in which the surface of silica is modified with a particular organosilicon compound and a silane coupling agent in solution. The resultant organic silica master batch elastomer exhibits improved mechanical properties, wear resistance and blending processability, and can provide the effect of extending durability of a tire.

15 Claims, No Drawings

SILICA MASTER BATCH ELASTOMERS FILLED WITH ORGANICALLY MODIFIED SILICA FOR A TIRE AND PREPARATION METHOD THEREOF

CROSS-REFERENCE TO RELATED APPLICATION

This application claims under 35 U.S.C. §119(a) the benefit of Korean Patent Application No. 10-2007-00136853 filed Dec. 24, 2007, the entire contents of which are incorporated herein by reference.

BACKGROUND (a) Technical Field

The present invention relates to an organic silica master batch elastomer for a tire, which comprises a specific organosilicon compound and silica organically surface-modified by a silane coupling agent, and a preparation method thereof.

(b) Background Art

In general, in the process of manufacturing tires, tire threads are fabricated by mixing rubber and filler in a mixer. As for the rubber, styrene butadiene copolymer and conjugated diene based rubber are used, and as for the filler, carbon black or silica is used alone or in combination as a reinforcing material.

Silica is an environment-friendly material. In recent years, with far more strict environmental regulations and rapidly increasing oil prices, silica has been spotlighted as a tire filler, and its use is on rapid increase. However, when silica is used as a reinforcing material, silica particles may aggregate with each other due to inter-particular interaction to form large-sized particles, which results in problems in mixing with rubber and dispersion of silica itself. Since dispersion of silica in rubber has much impact on the wear and life of tires, it is very important to maximize dispersibility of silica.

Occasionally, a master batch type elastomer is used by mixing with carbon black in order to improve dispersibility of reinforcing material and simplify tire manufacturing process. However, when a silica master batch type elastomer is prepared from a diene based copolymer prepared by solution polymerization, most of silica is lost by water during steam stripping because silica is hydrophilic. Therefore, there has been much limitation in the preparation of silica master batch type elastomer through solution polymerization in commercial scale. In addition, when hydrophobic silica is used as a tire reinforcing material, it is difficult to attain the mechanical properties required for a tire because chemical bonding with rubber is impossible.

Various researches have been carried out for the development of the use of silica for maximizing its dispersibility. For example, U.S. Pat. No. 5,925,713 discloses a technique of improving affinity to a filler through modification using a monomer having an epoxy group, and Korean Unexamined Patent Publication Nos. 94-019797 and 94-019795 disclose examples of improving wear resistance and impact resistance at low temperature by dispersing polymethylsiloxane in composition.

In addition, various researches have been performed in order to improve of silica through modification by introducing terminal groups to rubber. But, these approaches are restricted in improving dispersibility of a filler. Some silica manufacturers have introduced a technique of preparing a silica master batch elastomer comprising rubber and general-use silica using a specially designed apparatus. However, silica is not sufficiently dispersed in the rubber mixture. Further, when such prepared mixture is used to manufacture a tire, there are problems associated with processability and production because of the increase of Mooney viscosity [DKT 2006 Poster 33, "Rubber Filler Composition based on Solution Polymers and Silica—Status of Developments"].

A technique of improving compatibility with rubber using hydrophobic silica is introduced in WO 1998/37015 (Korean Patent Laid-open No. 2000-0075614). The use of hydrophobic silica results in improved compatibility with rubber. But, modulus, tensile characteristics and wear characteristics of tire deteriorate significantly because of difficulty in chemical bonding with rubber.

Korean Patent Laid-open No. 2002-0021407 discloses a method of preparing a tire material in the form of silica or carbon black master batch by mixing silica or carbon black in rubber latex prepared by emulsion polymerization. However, with a copolymer prepared by emulsion polymerization, it is difficult to attain low rolling resistance, high wet resistance and low heat generation required for a high-performance tire.

Ultimately, in order to satisfy the physical properties required for such silica tire, a silica master batch type elastomer prepared from conjugated diene or vinyl aromatic copolymer prepared by solution polymerization has to be used.

Until now, a technique by which a silica master batch type elastomer can be developed using a commercial solution polymer is unavailable.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In order to maximize dispersibility of silica, which is used as modifier during solution polymerization, the present invention provides an organic silica master batch elastomer for a tire, which is prepared by modifying the surface of silica using a specific organosilicon compound and a silane coupling agent to prepare organically modified silica and mixing the same in solution with a copolymer prepared by solution polymerization of a conjugated diene based monomer, a vinyl aromatic monomer or a mixture thereof.

In an aspect, the present invention provides a preparation method of an organic silica master batch elastomer for a tire, which comprises: a first step of solution polymerizing a conjugated diene based monomer, a vinyl aromatic monomer or a mixture thereof to prepare a copolymer; a second step of reacting silica with 1 to 10 weight % of an organosilicon compound represented by the following Chemical Formula 1 and 1 to 10 weight % of a silane coupling agent represented by the following Chemical Formula 2 to prepare organically surface-modified silica; and a third step of mixing 100 parts by weight of the copolymer prepared in the first step with 10 to 150 parts by weight of the organically modified silica prepared in the second step in solution, and drying to prepare a master batch elastomer:

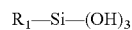   [Chemical Formula 1]

wherein $R_1$ represents a $C_5$ to $C_{20}$ alicyclic hydrocarbon compound; and

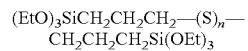   [Chemical Formula 2]

wherein n is 2 or 4.

In another aspect, the present invention provides an organic silica master batch elastomer for a tire, which comprises: 100 parts by weight of a copolymer prepared by solution polymerization of a conjugated diene based monomer, a vinyl aromatic monomer or a mixture thereof; and 10 to 150 parts by weight of organically modified silica in which a reaction product of 1 to 10 weight % of the organosilicon compound represented by Chemical Formula 1 and 1 to 10 weight % of the silane coupling agent represented by Chemical Formula 2 is coated on the surface of silica.

When the master batch elastomer comprising silica organically surface-modified using the particular compound according to the present invention is used as a tire material, dispersibility and compatibility of silica are improved outstandingly. As a result, wear resistance and mechanical properties required for a silica tire are improved significantly and, ultimately, life cycle of the tire is increased. Further, improved wear resistance characteristics compared to existing silica tires result in decreased stopping distance and improved safety. In addition, along with reduced processing time, the silica dispersion problem occurring during the manufacture of tires is solved, and products with uniform properties can be obtained.

DETAILED DESCRIPTION

The present invention relates to a preparation method of an organic silica master batch elastomer for a tire, which comprises preparing organically modified silica by modifying the surface of silica, which is used as a reinforcing material during solution polymerization of a conjugated diene based monomer, a vinyl aromatic monomer or a mixture thereof to prepare a copolymer, using a specific organosilicon compound and a silane coupling agent in order to maximize the effect of silica, and mixing the organically modified silica with a copolymer prepared by solution polymerization, and a master batch elastomer prepared by the method.

Hereunder is given a more detailed description about the preparation method of an organic silica master batch elastomer for a tire according to the present invention.

A conjugated diene based monomer, a vinyl aromatic monomer or a mixture thereof is solution polymerized to prepare a copolymer.

The solution polymerization employed for the preparation of copolymer may be one commonly used in the art and is not particularly limited. The solution polymerization is carried out by mixing a solvent capable of dissolving the conjugated diene based monomer and the vinyl aromatic monomer, a coupling agent, a randomizing agent, an antioxidant, and the like.

The solvent may be an aromatic, aliphatic or a cyclic compound. Specifically, cyclohexane, toluene, n-hexane, n-heptane, and the like may be used in an amount of 0.1 to 0.4 part by weight based on 1 part by weight of the total monomers. The coupling agent may be a tin compound, a silicon compound, an epoxy compound or a polysiloxane compound. Specifically, tin tetrachloride, silicon tetrachloride, tetraepoxy, polyfunctional polysiloxane, and the like may be used in an amount of 0.1 to 0.001 part by weight based on 100 parts by weight of the total monomers.

The solution polymerization is carried out at 10 to 120° C. When the temperature is below 10° C., a lot of time is required for the reaction because of low reaction rate and, therefore, commercial-scale application is impossible. And, when it exceeds 120° C., there are problems in safety and adequate control of molecular structure. Hence, it is preferred that the aforesaid range be maintained.

The conjugated diene based monomer and the vinyl aromatic monomer may be ones commonly used in the art and are not particularly limited. Specifically, the conjugated diene based monomer may be 1,3-butadiene, isoprene or a mixture thereof, and the vinyl aromatic monomer may be styrene, α-methylstyrene or a mixture thereof.

Next, silica is reacted with 1 to 10 weight % of the organosilicon compound represented by Chemical Formula 1 and 1 to 10 weight % of the silane coupling agent represented by Chemical Formula 2 to prepare organically surface-modified silica. Preferably, the compounds are mixed approximately at 50 to 60° C. in a temperature-controllable reactor equipped with an agitator.

A preferable example of the compound represented by Chemical Formula 1 is cyclopentenyltrihydroxysilane, which is phase-separable from water and commercially available. Further, preferable examples of the compound represented by Chemical Formula 2 include bis(triethoxysilylpropyl)tetrasulfide, bis(triethoxysilylpropyl)disulfide, etc., which are couplable with an organic elastomer and provide superior reinforcing effect.

The total amount of the organosilicon compound represented by Chemical Formula 1 and the silane coupling agent represented by Chemical Formula 2 is maintained in the range of 2 to 20 weight %. When the amount is less than 2 weight %, sufficient phase separation from water cannot be expected because it is difficult to make the hydrophilic silica hydrophobic. And, when it exceeds 20 weight %, the organic compound and the silane coupling agent remaining unreacted with the silica surface remain in the polymer, thereby resulting in poor mechanical properties. As a result, it is difficult to expect good wear resistance and low heat generation. More preferably, the total amount of the organic compounds is maintained at 5 to 15 weight % based on the weight of silica. This content corresponds to the degree of modification of the silica surface.

In more detail, when the amount of the organosilicon compound represented by Chemical Formula 1 is below 1 weight %, commercial-scale production of WMB SSBR is impossible because of insufficient phase separation from water. And, when it exceeds 10 weight %, desired mechanical properties and wear resistance cannot be attained because of poor compound properties. Hence, it is preferred that the organosilicon compound is used in an amount of 1 to 10 weight %. And, when the amount of the silane coupling agent represented by Chemical Formula 2 is below 1 weight %, sufficient bonding between the elastomer and silica cannot be maintained. And, when it exceeds 10 weight %, such problems as reduced mechanical properties, increase of Mooney viscosity during mixing, and gelation may occur. Hence, it is preferred that the silane coupling agent is used in an amount of 1 to 10 weight %.

Next, 100 parts by weight of the copolymer and 10 to 150 parts by weight of organically modified silica prepared above are mixed in solution to prepare a mixture solution. The solvent used to prepare the solution may be the same aromatic, aliphatic or cyclic compound used as solvent when preparing the copolymer. The solvent is used in an amount of 10 to 30 weight % based on the total weight of the copolymer and the organically modified silica. When the amount is less than 10 weight %, a large amount of steam and high utility cost are required in the process of removing the solvent and sufficient removal of the solvent is difficult. And, when the amount exceeds 30 weight %, uniform mixing of the organic silica elastomer becomes difficult. Hence, it is preferred that the aforesaid range be maintained. The mixing is carried out in a reactor equipped with an agitator at about 50 to 60° C. for about 1 hour.

When the amount of the organically modified silica is less than 10 parts by weight, reinforcing effect provided by the organically modified silica cannot be ensured. And, when it exceeds 150 parts by weight, commercial-scale production becomes impossible due to phase separation of the organically modified silica and the elastomer. Hence, it is preferred that the aforesaid range be maintained.

In order to improve processability and oxidation stability of the master batch elastomer, an aromatic process oil commonly used in the related art may be added to the mixture. This additive component may be added in an amount which does not negatively affect the purpose of the present invention.

Such prepared mixture is subjected to steam stripping and roll drying to prepare a master batch elastomer. The steam stripping and roll drying may be carried out by the methods commonly used in the related art and are not particularly limited.

The resultant master batch elastomer can solve the silica dust problem, reduce tire mixing time, and improve tire processability, silica dispersibility, mechanical properties and wear resistance, when used as tire material, as compared to conventional silica tire.

EXAMPLES

The following examples illustrate the invention and are not intended to limit the same.

Example 1

198 g of styrene, 390 g of 1,3-butadiene and 3,600 g of cyclohexane were put in a 10-L stainless steel reactor. Then 0.5 g of ditetrahydrofurylpropane was added to the reactor. After the addition had been completed, temperature inside the reactor was adjusted to 35° C. while operating the agitator. When the reactor temperature reached the predetermined temperature, 2.4 mmol of n-butyllithium was added to the reactor, and an adiabatic heating reaction was carried out.

When the reaction temperature reached the highest temperature, which is approximately 100° C., 12 g of 1,3-butadiene was further added to substitute the terminal group with butadiene. After the addition of butadiene had been completed, 0.4 g of α,ω-bis(2-trichlorosilylethyl)polymethylsiloxane was added to the reactor, and coupling reaction was carried out by allowing to stand for a while.

After the coupling reaction had been finished, the resultant polymer was transferred to a blend storage tank equipped with an agitator. Then, 330 g of organically modified silica dispersed in 1000 g of cyclohexane was added to the blend storage tank to mix the rubber and silica in solution. The organically modified silica was one comprising 5 weight % of cyclopentyltrihydroxysilane and 5 weight % of Si-69 (bis(triethoxysilylpropyl)tetrasulfide, Degussa), with 10 weight % of the surface of silica being modified.

Next, after mixing the organically modified silica and the rubber solution, 225 g of extended oil (37.5 parts by weight based on 100 parts by weight of mixture of the organically modified silica and the rubber solution) and 6 g of butylated hydroxytoluene (BHT) (1 part by weight based on 100 parts by weight of mixture of the organically modified silica and the rubber solution), as antioxidant, were added. After sufficient agitation, the mixture was put in warm water heated with steam to remove the solvent. Then, after roll drying, a master batch elastomer was prepared.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Example 2

A master batch elastomer was prepared in the same manner as in Example 1, except for using organically modified silica comprising 8 weight % of cyclopentyltrihydroxysilane and 8 weight % of bis(triethoxysilylpropyl)tetrasulfide, with 16 weight % of the surface of silica being modified.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Example 3

A master batch elastomer was prepared in the same manner as in Example 1, except for using organically modified silica comprising 5 weight % of cyclopentyltrihydroxysilane and 5 weight % of bis(triethoxysilylpropyl)disulfide, with 10 weight % of the surface of silica being modified.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Comparative Example 1

A master batch elastomer was prepared in the same manner as in Example 1, except for using organically modified silica comprising 10 weight % of cyclopentyltrihydroxysilane, with 10 weight % of the surface of silica being modified.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Comparative Example 2

A master batch elastomer was prepared in the same manner as in Example 1, except for using non-surface-treated, common silica instead of organically modified silica.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Comparative Example 3

A master batch elastomer was prepared in the same manner as in Example 1, except for using organically modified silica comprising 10 weight % of bis(triethoxysilylpropyl)tetrasulfide, with 10 weight % of the surface of silica being modified.

In order to find out the structure and physical properties of the resultant master batch elastomer, 1) polymer microstructure (NMR), 2) molecular weight, coupling number, coupling ratio and molecular weight distribution (GPC), and 3) Mooney viscosity of the polymer and the blend (Mooney viscometer) were measured. Further, dynamic properties of the blend (DMTA), and silica content of the silica master batch elastomer (TGA) were analyzed. The result is given in Table 1.

Test Example

In order to evaluate physical properties of the master batch elastomers prepared in Examples 1 to 3 and Comparative Examples 1 to 3, the components listed in Table 2 were blended, and blending processability and physical properties and dynamic characteristics after the blending were compared.

[Physical Property Measurement]
1. Hardness: Measured using Shore-A hardness meter.
2. Tensile strength, 300% modulus and elongation: Measured using UTM (universal test machine) according to ASTM 3189, Method B.
3. Dynamic property of vulcanized rubber (Tan δ): Analyzed using DMTA 5 instrument of Rheometic, under the condition of 10 Hz and 0.1% modification.
4. Wear resistance: Analyzed using DIN abrasion meter.

TABLE 2

| Blending components (g) | WMB (wet master batch) SSBR blending condition | Blending components (g) | WMB (wet master batch) SSBR blending condition |
|---|---|---|---|
| Organic silica elastomer SSBR | 155 | SSBR | 100 |
| Stearic acid | 1.5 | Stearic acid | 1.5 |
| Zno | 2.5 | Zno | 2.5 |
| Silica (#1165) | — | Silica (#1165) | 55 |
| Aromatic oil | 37.5 | Aromatic oil | 37.5 |
| Si-69 (TESPT) | 4.4 | Si-69 (TESPT) | 4.4 |

TABLE 1

| | Coupling ratio (%) | Silica modified compound[5] | Molecular weight[2] | Styrene content[1] (%) | Vinyl content[1] (%) | Polymer Mooney viscosity | Residual silica content, actual[6] (phr) | Residual silica content, theoretical (phr) |
|---|---|---|---|---|---|---|---|---|
| Ex. 1 | 60 | Cyclopentyltrihydroxysilane (5 weight %) + Si-69[3] (5 weight %) | 620000 | 33 | 48 | 132 | 54 | 55 |
| Ex. 2 | 60 | Cyclopentyltrihydroxysilane (5 weight %) + Si-69[4] (5 weight %) | 620000 | 33 | 48 | 132 | 54 | 55 |
| Ex. 3 | 60 | Cyclopentyltrihydroxysilane (8 weight %) + Si-69[3] (8 weight %) | 620000 | 33 | 48 | 125 | 55 | 55 |
| Comp. Ex. 1 | 62 | Cyclopentyltrihydroxysilane (10 weight %) | 642000 | 33 | 48 | 134 | 54 | 55 |
| Comp. Ex. 2 | 59 | — | 653000 | 33 | 48 | 137 | 13 | 55 |
| Comp. Ex. 3 | 60 | Si-69[3] (10 weight %) | 65200 | 33 | 48 | 135 | 51 | 55 |

Note:
[1] Styrene and vinyl contents: NMR analysis result
[2] Molecular weight: Distribution of total molecular weight
[3] Si-69: Bis-(3-triethoxysilylpropyl)tetrasulfide
[4] Si-69: Bis-(3-triethoxysilylpropyl)disulfide
[5] Weight % of Silica modified organic compound is based on silica
[6] TGA analysis result (performed under oxygen atmosphere by heating at 20° C./min from 50° C. to 900° C., using TAC 7, Perkin-Elmer)

TABLE 2-continued

| Blending components (g) | WMB (wet master batch) SSBR blending condition | Blending components (g) | WMB (wet master batch) SSBR blending condition |
|---|---|---|---|
| CZ | 2.0 | CZ | 2.0 |
| DPG | 1.5 | DPG | 1.5 |
| Sulfur | 1.5 | Sulfur | 1.5 |

Silica was added further during blending, considering the lost amount.
Si-69: Bis-(3-triethoxysilylpropyl)tetrasulfide
DPG: 1,3-Diphenylguanidine
CZ: N-Cyclohexylbenzothiazylsulfonamide

TABLE 3

|  | Ex. 1 | Ex. 2 | Ex. 3 | Comp. Ex. 1 | Comp. Ex. 2 | Comp. Ex. 3 |
|---|---|---|---|---|---|---|
| Compound Mooney viscosity | 73.3 | 73 | 70 | 75 | 78 | 79 |
| Hardness (Shore-A) | 48 | 48 | 46 | 48 | 48 | 49 |
| Tensile strength (kg/cm$^2$) | 208 | 207 | 198 | 178 | 165 | 155 |
| 300% modulus (kg/cm$^2$) | 121 | 120 | 110 | 110 | 110 | 110 |
| Elongation (%) | 510 | 500 | 450 | 450 | 460 | 455 |
| Compound Tg (° C.) | −4.5 | −4.6 | −5.5 | −5.0 | −4.8 | −4.6 |
| Tan δ (at 10° C.) | 1.2145 | 1.2144 | 1.2544 | 1.1972 | 1.0970 | 1.0812 |
| Tan δ (at 60° C.) | 0.0975 | 0.0974 | 0.0991 | 0.0977 | 0.0981 | 0.0976 |
| Wear (DIN, g) | 0.2777 | 0.2776 | 0.2943 | 0.3203 | 0.302 | 0.3101 |

As seen in Table 3, Examples 1 to 3, in which the master batch elastomers were prepared by blending the organically modified silica according to the present invention, exhibited improved compound Mooney viscosity, tensile strength, tan δ at low temperature, and DIN wear resistance, when compared with Comparative Examples 1 to 3. Further, they showed comparable or better hardness, 300% modulus, elongation, compound Tg, and tan δ at high temperature.

Although the preferred embodiments of the present invention have been disclosed for illustrative purposes, those skilled in the art will appreciate that various modifications, additions and substitutions are possible, without departing from the spirit and scope of the invention as disclosed in the accompanying claims.

The invention claimed is:

1. A method of preparing an organic silica master batch elastomer for a tire, which comprises:
    a first step of polymerizing a conjugated diene based monomer and a vinyl aromatic monomer to prepare a copolymer;
    a second step of reacting silica with 1 to 10 weight %, based on the amount of silica, of an organosilicon compound represented by the following Chemical Formula 1

R$_1$—Si—(OH)$_3$ (Chemical Formula 1)

wherein R$_1$ represents a C$_5$ to C$_{20}$ alicyclic hydrocarbon compound; and
    1 to 10 weight %, based on the amount of silica, of a silane coupling agent represented by the following Chemical Formula 2

(EtO)$_3$SiCH$_2$CH$_2$CH$_2$—(S)$_n$—
    CH$_2$CH$_2$CH$_2$Si(OEt)$_3$ (Chemical Formula 2)

wherein n is 2 or 4;
    to prepare organically surface-modified silica; and
    mixing 100 parts by weight of the copolymer prepared in the first step with 10 to 150 parts by weight of the organically modified silica prepared in the second step in solution, and
    drying to prepare a master batch elastomer.

2. The method as set forth in claim 1, wherein the organically modified silica is one in which 5 to 15 weight % of the amount of silica is modified.

3. The method as set forth in claim 1, wherein the compound represented by Chemical Formula 1 is cyclopentenyl-trihydroxysilane.

4. The method as set forth in claim 1, wherein the compound represented by Chemical Formula 2 is bis(triethoxysilylpropyl)tetrasulfide or bis(triethoxysilylpropyl)disulfide.

5. The method as set forth in claim 1, wherein the conjugated diene based monomer is 1,3-butadiene, isoprene or a mixture thereof.

6. The method as set forth in claim 1, wherein the vinyl aromatic monomer is styrene, α-methylstyrene or a mixture thereof.

7. The method as set forth in claim 1, wherein the solution polymerization in the first step and the mixing in the third step are carried out using a solvent selected from cyclohexane, toluene, n-hexane and n-heptane.

8. An organic silica master batch elastomer for a tire, which comprises:
    100 parts by weight of a copolymer prepared by solution polymerization of a conjugated diene based monomer and a vinyl aromatic monomer; and
    10 to 150 parts by weight of organically modified silica in which a reaction product of 1 to 10 weight %, based on the weight of silica, of an organosilicon compound represented by the following Chemical Formula 1

R$_1$—Si—(OH)$_3$ (Chemical Formula 1)

wherein R$_1$ represents a C$_5$ to C$_{20}$ alicyclic hydrocarbon compound; and
    1 to 10 weight %, based on the weight of silica, of a silane coupling agent represented by the following Chemical Formula 2

(EtO)$_3$SiCH$_2$CH$_2$CH$_2$—(S)$_n$—
    CH$_2$CH$_2$CH$_2$Si(OEt)$_3$ (Chemical Formula 2)

wherein n is 2 or 4;
    is coated on the surface of silica.

9. The method as set forth in claim 3, wherein the compound represented by Chemical Formula 2 is bis(triethoxysilylpropyl)tetrasulfide or bis(triethoxysilylpropyl)disulfide.

10. The method as set forth in claim 9, wherein the conjugated diene based monomer is 1,3-butadiene, isoprene or a mixture thereof.

11. The method as set forth in claim 9, wherein the vinyl aromatic monomer is styrene, α-methylstyrene or a mixture thereof.

12. The method as set forth in claim 10, wherein the vinyl aromatic monomer is styrene, α-methylstyrene or a mixture thereof.

13. The method as set forth in claim 10, wherein the solution polymerization in the first step and the mixing in the third step are carried out using a solvent selected from cyclohexane, toluene, n-hexane and n-heptane.

14. The method as set forth in claim 11, wherein the solution polymerization in the first step and the mixing in the third step are carried out using a solvent selected from cyclohexane, toluene, n-hexane and n-heptane.

15. The method as set forth in claim 12, wherein the solution polymerization in the first step and the mixing in the third step are carried out using a solvent selected from cyclohexane, toluene, n-hexane and n-heptane.

* * * * *